Patented Nov. 24, 1931

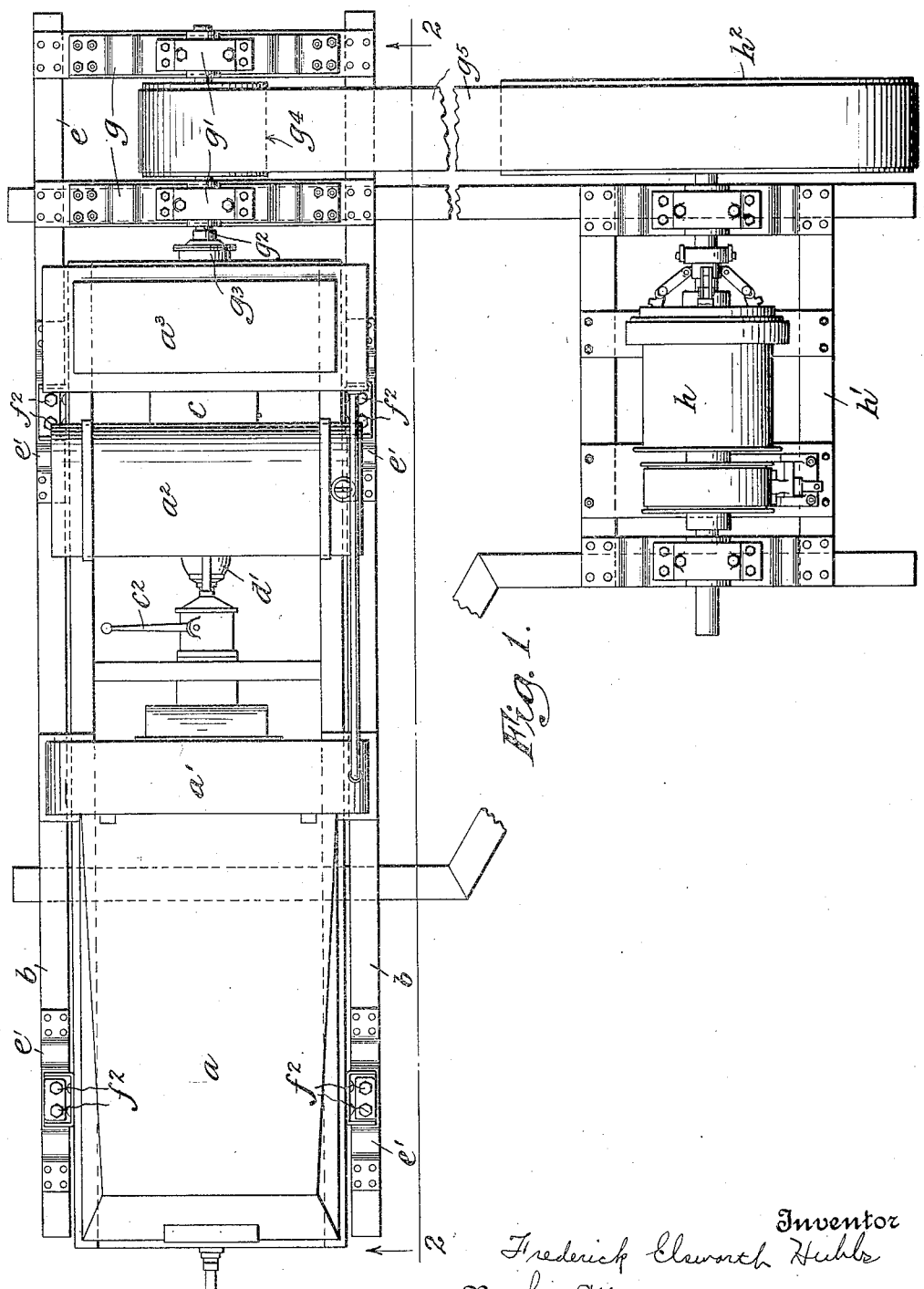

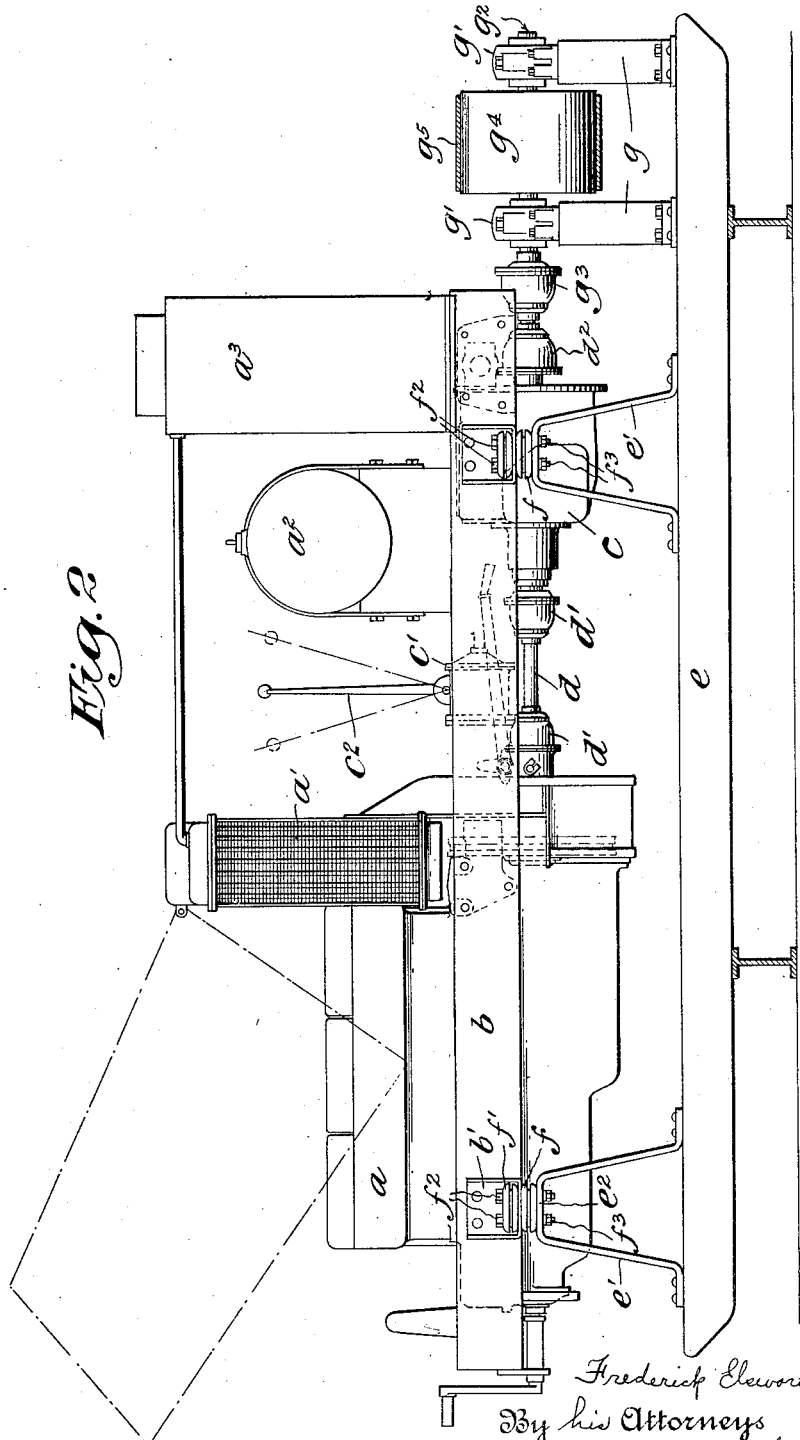

1,833,050

UNITED STATES PATENT OFFICE

FREDERICK ELSWORTH HUBBS, OF DENVER, COLORADO, ASSIGNOR TO INTERNATIONAL MOTOR COMPANY, OF NEW YORK, N. Y., A CORPORATION OF DELAWARE

POWER UNIT

Application filed October 24, 1927. Serial No. 228,189.

This invention relates to power units wherein an internal combustion engine is mounted upon a base which serves, additionally as a mounting for a variable speed transmission, the power being supplied to a pulley or other device mounted as a unit in proper relation to the engine structure.

In units of this character it is desirable that the elements thereof be mounted so that it can be transported from place to place with comparative ease. It is also desirable that the mounting be quite rigid when placed in an operating position. These units are particularly useful in oil fields where the diverse tasks require portability, strength and flexibility. It has been found that the gasoline engine is far more economical and serviceable than the steam units heretofore used and to adapt the unit to this service fully, it is quite essential that a variable speed transmission be used to provide the required flexibility. An object of this invention is to provide a unit of the above character having the engine and transmission securely mounted as a unit and a final power delivering means driven therefrom but being mounted to permit a desired degree of movement therebetween in order that the vibrations from the drilling or other work will not be transmitted to the engine. Although there is an isolation of the vibrations from the work, the elements are mounted upon a common base plate, cushioning means being interposed between the respective elements to aid in isolating the engine and transmission from the power delivering element.

Further objects will appear as the description proceeds and reference will now be had to the accompanying drawings for a more detailed description thereof.

In the drawings:

Figure 1 is a plan view of the power plant mounted in accordance with the present invention.

Figure 2 is a view in elevation showing the manner in which the elements constituting the unit, are assembled.

Referring to the above figures, an internal combustion engine $a$ is mounted upon a frame $b$. Carried with the frame $b$ is a change speed transmission $c$ which is driven from the engine through shaft section $d$ mounted between two universal joints $d'$. The usual accessories, such as radiator $a'$, gas tank $a^2$ and water reservoir $a^3$ are carried upon the frame and with the units in a suitable manner, the entire structure being a unitary one.

The transmission $c$ is of a type to provide a variable speed at the power delivery end of the unit for a relatively constant speed of the internal combustion engine. The mechanism for controlling the shifting of the transmission is indicated generally at $c'$, a lever $c^2$ being provided to actuate the mechanism. This structure is in accordance with the usual practice in devices of this character and the specific elements thereof form no part of the present invention.

The unit described above is mounted upon a bed plate $e$ through suitable standards $e'$. These are shown as strips of metal formed with flat surfaces $e^2$ upon which the frame $b$ is carried. Blocks of yielding non-metallic material $f$ are carried upon either sides of brackets $b'$ mounted upon the frame $b$ and suitable seats $f'$ place the yielding non-metallic material under compression when bolts $f^2$ are secured in position by nuts $f^3$. This mounting of the frame upon the bed plate $e$ serves to deaden the vibrations which are transmitted from one to the other and results in better performance of the power unit.

The bed plate $e$ carried at one end thereof, spaced vertical standards $g$ adapted to carry upon their upper surfaces, pillow blocks $g'$ to mount a shaft $g^2$. Universal joints $d^2$ and $g^3$ mount the shaft $g^2$ to the power unit and enable the latter to deliver power to a pulley $g^4$ which may be used for driving drills, compressors or other devices.

In Figure 1, the pulley $g^4$ is shown as driving a drum hoist $h$ mounted upon a suitable sub-structure $h'$, the belt $g^5$ extending over pulley $g^4$ and pulley $h^2$, the latter driving the hoist $h$.

By mounting the pulley as a separate unit upon the bed plate $e$, the vibrations due to irregularities in torque transmission are isolated from the unitary engine and transmission mounting provided by frame $b$. The yielding non-metallic mounting of the frame *b* upon the bed plate *e* further isolates the power unit and provides better operation thereof.

The invention is specific to the construction shown in the accompanying drawings, wherein the power delivering means, such as a pulley, is mounted as a unit upon a bed plate and driven from a variable speed power plant which is mounted upon the bed plate independently of the power delivering means.

I claim as my invention:

A unit of the character described comprising an internal combustion engine, a variable speed transmission driven thereby, a frame, means to mount the engine and transmission upon the frame as an assembled unit, a bed plate independent of the frame, means to mount the frame on the bed plate, a drive pulley driven from the transmission, pillow blocks supporting the pulley, and means to mount the pillow blocks upon the bed plate independently of the frame, whereby vibrations in the pulley will be partially isolated from the engine.

This specification signed this 17th day of October, A. D. 1927.

FREDERICK ELSWORTH HUBBS.